(12) United States Patent
Monserrat Del Rio et al.

(10) Patent No.: US 10,079,891 B2
(45) Date of Patent: Sep. 18, 2018

(54) CLUSTERHEAD DEVICE THAT FUNCTIONS AS A GATEWAY BETWEEN VEHICULAR AD-HOC NETWORK AND CELLULAR NETWORK

(71) Applicant: Bayerische Motoren Werke Aktiengesellschaft, Munich (DE)

(72) Inventors: Jose Francisco Monserrat Del Rio, Valencia (ES); Daniel Calabuig Soler, Valencia (ES); David Gozalvez Serrano, Munich (DE); Oliver Klemp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 15/356,228

(22) Filed: Nov. 18, 2016

(65) Prior Publication Data

US 2017/0070577 A1    Mar. 9, 2017

Related U.S. Application Data

(63) Continuation of application No. PCT/EP2015/053284, filed on Feb. 17, 2015.

(30) Foreign Application Priority Data

May 20, 2014 (DE) .................. 10 2014 209 579

(51) Int. Cl.
*H04L 29/08*    (2006.01)
*H04W 4/80*    (2018.01)
(Continued)

(52) U.S. Cl.
CPC .............. *H04L 67/12* (2013.01); *H04L 67/10* (2013.01); *H04L 67/42* (2013.01); *H04W 4/008* (2013.01);
(Continued)

(58) Field of Classification Search
None
See application file for complete search history.

(56) References Cited

U.S. PATENT DOCUMENTS

2006/0144827 A1    7/2006    Papenfuss et al.
2007/0115868 A1    5/2007    Chen et al.
(Continued)

FOREIGN PATENT DOCUMENTS

CA    2 690 989 A1    12/2008
CA    2 792 209 A1    8/2013
(Continued)

OTHER PUBLICATIONS

PCT/EP2015/053284, International Search Report dated May 29, 2015 (Three (3) pages).
(Continued)

*Primary Examiner* — Hong Cho
(74) *Attorney, Agent, or Firm* — Crowell & Moring LLP

(57) ABSTRACT

A clusterhead device is capable of relaying group messages from a cellular network to an ad-hoc network, and vice versa. However, not every device that comprises a clusterhead device is activated as a clusterhead. Rather, only devices that do not receive enough beacon signals emitted by each motor vehicle are activated as a clusterhead. It is thus achieved that not too many motor vehicles function as a gateway.

17 Claims, 4 Drawing Sheets

(51) Int. Cl.
    *H04L 29/06* (2006.01)
    *H04W 84/20* (2009.01)
    *H04W 88/06* (2009.01)
    *H04W 4/00* (2018.01)
    *H04W 4/04* (2009.01)

(52) U.S. Cl.
    CPC .............. *H04W 4/046* (2013.01); *H04W 4/80* (2018.02); *H04W 84/20* (2013.01); *H04W 88/06* (2013.01)

(56) References Cited

U.S. PATENT DOCUMENTS

| | | |
|---|---|---|
| 2008/0314878 A1 | 12/2008 | Cai et al. |
| 2012/0152916 A1 | 6/2012 | Oowaki et al. |
| 2016/0212596 A1* | 7/2016 | Brahmi .................. H04L 67/12 |

FOREIGN PATENT DOCUMENTS

| | | |
|---|---|---|
| CN | 103246241 A | 8/2013 |
| EP | 2 162 808 A1 | 3/2010 |
| EP | 2 624 091 B1 | 7/2014 |
| JP | 3-50635 B2 | 8/1991 |
| JP | 2003-88969 A | 3/2003 |
| JP | 2007-54879 A | 3/2007 |
| JP | 2010-188350 A | 9/2010 |
| JP | 2010-530809 A | 9/2010 |
| WO | WO 01/45437 A1 | 6/2001 |
| WO | WO 2009/002638 A1 | 12/2008 |
| WO | WO 2011/024904 A1 | 3/2011 |

OTHER PUBLICATIONS

PCT/JP2015/053000, International Search Report dated Apr. 28, 2015 (Two (2) pages).

Seyhan Ucar, "Multi-Hop Cluster and LTE Based Heterogeneous Architecture for VANET", Sep. 12, 2013, XP055189129, retrieved from the Internet: URL:http://wnl.ku.edu.tr/uploads/1/0/5/9/10590997/wnl_seyhanucar_msthesis.pdf [retrieved on May 13, 2015], 59 total pages.

Abderrahim Benslimane et al. "Dynamic Clustering-Based Adaptive Mobile Gateway Management in Integrated VANET—3G Heterogeneous Wireless Networks", IEEE Journal on Selected Areas in Communications, IEEE Service Center, Piscataway, US, vol. 29, No. 3, Mar. 1, 2011, 53 total pages, XP011348545.

Remy G. et al., "LTE4V2X: LTE for a Centralized VANET Organization", Global Telecommunication Conference (GLOBECOM 2011), 2011 IEEE, IEEE, Dec. 5, 2011, p. 1-6, XP032119083.

Shou-Chih Lo et al., "A Multi-Head Clustering Algorithm in Vehicular Ad Hoc Networks", International Journal of Computer Theory and Engineering, Jan. 1, 2013, pp. 242-247, XP055189154.

* cited by examiner

CLUSTERHEAD DEVICE THAT FUNCTIONS AS A GATEWAY BETWEEN VEHICULAR AD-HOC NETWORK AND CELLULAR NETWORK

CROSS REFERENCE TO RELATED APPLICATIONS

This application is a continuation of PCT International Application No. PCT/EP2015/053284, filed Feb. 17, 2015, which claims priority under 35 U.S.C. § 119 from German Patent Application No. 10 2014 209 579.4, filed May 20, 2014, the entire disclosures of which are herein expressly incorporated by reference.

BACKGROUND AND SUMMARY OF THE INVENTION

The present invention relates to a method for dispatching information between two mobile communication networks, an associated device and an associated motor vehicle.

Mobile ad-hoc networks (MANETs), in particular vehicular ad-hoc networks (VANETs) are characterized in particular by the mobility of the communication nodes and by the absence of a fixed infrastructure. As a result, they are becoming increasingly suitable for use in motor vehicles. Many of these technologies are based on the IEEE 802.11 protocol for MANETs and on the IEEE 802.11p protocol for VANETs. However, due to the high availability of an infrastructure for cellular networks, cellular-based radio networks, such as, for example, cellular networks based on the 3GPP LTE protocol, are suitable for use in motor vehicles.

For the use of hybrid networks for motor vehicles, it has hitherto been assumed that purely ad-hoc network-enabled motor vehicles can communicate with other purely ad-hoc network-enabled motor vehicles, and that purely cellular-network-enabled motor vehicles can communicate with other purely cellular-network-enabled motor vehicles.

It would therefore be desirable to provide a facility that can improve the communication capability of motor vehicles between one another.

An object of the invention is to propose a facility that avoids or at least reduces some of the disadvantages known in the prior art.

One embodiment of the invention relates to a method for dispatching information between two mobile communication networks, wherein a first mobile communication network is preferably a mobile ad-hoc network, in particular a vehicular ad-hoc network, and wherein a second mobile communication network is preferably a cellular network, wherein the method entails: defining a decision interval; monitoring a signal channel for receiving a beacon signal; reducing a clusterhead probability for each received beacon signal in the decision interval; deciding to be a clusterhead, with the clusterhead probability. If the decision to be a clusterhead is positive: communicating the decision to be a clusterhead by dispatching a clusterhead decision group message via the first mobile communication network; if a group message is received via the first mobile communication network, dispatching this group message via the second mobile communication network; and, if a group message is received via the second mobile communication network, dispatching this group message via the first mobile communication network.

A dispatch of information between two mobile communication networks within the meaning of the invention may mean that information that is of interest to at least a part of a group of the two mobile communication networks is intended to be dispatched. In the case of motor vehicles as group participants, information of this type may, for example, be traffic information that may relate to the group participants, but may also be queries from one group participant to the remaining group participants. In the case of motor vehicles, the individual motor vehicles participating in the road traffic may be understood as group participants. Groups of this type may, however, be smaller, more limited. On a highway, for example, not only the motor vehicles that are located on the corresponding highway but also motor vehicles that are planning to drive onto the corresponding highway, for example by means of a corresponding route planning in the navigation system of the motor vehicle, may be group participants. In such a case, the group participants may also be limited to a closer environment, for example within a corresponding radius of a corresponding roadworks site on the highway. It may furthermore also be appropriate to forward a group message of this type to a server, server system or server cloud located outside the hybrid network, or to dispatch a group message of this type from a server, server system or server cloud of this type to the group or to a corresponding clusterhead.

A mobile ad-hoc network within the meaning of the invention means a self-configuring, infrastructure-free network of mobile radio communication devices that are wirelessly interconnected. A mobile ad-hoc network of this type is referred to as a MANET. Each mobile radio communication device of a MANET can move freely and can thus frequently change its connections to other mobile radio communication devices located in the MANET. A preferably used protocol for MANETs is, for example, the IEEE 802.11.

A vehicular ad-hoc network within the meaning of the invention may be a special MANET. A vehicle ad-hoc network of this type is also referred to as a VANET. In VANETs, motor vehicles are preferably used as mobile nodes in order to set up a MANET. In a VANET, each participating motor vehicle is a wireless router or a node of the network. A VANET allows the participating motor vehicles to connect to one another over a maximum distance of some 100-300 m, as a result of which a large wide area network can be created. Current VANET protocols are, for example, the protocols based on the IEEE 802.11p standard, such as ETSI ITS-G5 or IEEE 1609, IEEE 802.16 (Wi-MAX), Bluetooth, IRA and ZigBee.

A cellular network within the meaning of the invention may be a mobile radio network. A cellular network of this type requires an infrastructure based on radio cells. Examples of mobile radio networks of this type are the Global System for Mobile Communications (GSM) network, the General Packet Radio Service (GPRS) network, the Universal Mobile Telecommunications System (UMTS) network and the Long Term Evolution (LTE) network.

A MANET/VANET and a cellular network can jointly form a hybrid network whereby, for example, motor vehicles can exchange information with one another, such as information relating to traffic situations ahead.

A monitoring of a signal channel within the meaning of the invention may be a monitoring of a channel of this type for a specific event.

A beacon signal within the meaning in the invention may be a small, continuously or regularly dispatched data packet in a wireless network. A beacon signal of this type may, for example, be dispatched regularly every 500 ms. A beacon signal of this type can be dispatched by the participants of the corresponding network.

A clusterhead within the meaning of the invention may be a network participant functioning as a gateway or router.

A group message within the meaning of the invention may mean a message intended for those participants that are located in the same MANET and/or VANET, such as the dispatcher of the group message. A group message of this type may also be dispatched to a server outside the MANET and/or VANET. The message may be retained and/or further processed there, for example for statistical purposes, or, for example, in order to further distribute the message via the network from which the message was dispatched, for example to participants of a cellular network within the same hybrid network.

A clusterhead decision group message within the meaning of the invention may mean a message which contains information indicating that the dispatcher of the message is a clusterhead and therefore its further messages are to be received and taken into account. It may furthermore also mean a message which notifies the recipient that the dispatcher of the message, i.e. the corresponding clusterhead, receives and further distributes individual messages intended for the group in the network. The decision to be a clusterhead can preferably be taken during or on expiry of the decision interval, but preferably when the decision interval has expired.

Through the teaching according to the invention, the advantage is achieved that vehicles which are not all both mobile ad-hoc network-enabled and cellular-network-enabled may be located jointly as a group in a hybrid network, i.e. a network which is set up as both a mobile ad-hoc and a cellular network, and can communicate with one another.

A further advantage of the teaching according to the invention is that, due to the type of decision concerning who is and is not a clusterhead, the organizational requirement or processing requirement for taking this decision in an optimized dynamic manner can be reduced, and in the best case can be minimized. It can thus be decided locally and dynamically which hybrid-network-enabled participant functions as a gateway and which does not, in order to guarantee an optimum coverage of the group participants in the mobile hybrid network and take account of the fact that not too many hybrid-network-enabled participants function as gateways and therefore the mobile hybrid network can be supplied with messages in an optimum manner without burdening it unnecessarily with redundant data/messages.

A further advantage of the teaching according to the invention is that processing power already present in the individual participants of the network can be used and therefore the need for the processing power of a server, server network and/or cloud located outside the corresponding MANET/VANET can be largely, but preferably entirely, eliminated.

In one or more embodiments, a device for dispatching information between two mobile communication networks is provided, whereby a first mobile communication network is preferably a mobile ad-hoc network, in particular a vehicular ad-hoc network, and wherein a second mobile communication network is preferably a cellular network, said device having: a mobile ad-hoc network-enabled device, in particular a vehicular ad-hoc network-enabled device, a cellular-network-enabled device and a clusterhead device. The clusterhead device is configured to carry out any method according to the invention.

Through the teaching according to the invention, the advantage is achieved that hybrid network participants can be configured to be both mobile ad-hoc network-enabled and cellular-network-enabled in order to be able to function as a clusterhead and to enable them to be located together with non-hybrid network participants as a group in a hybrid network, i.e. a network that is set up as both a mobile ad-hoc network and a cellular network, in order to be able to communicate with one another.

A further advantage according to the invention is that the communication between ad-hoc-enabled group participants, in particular ad-hoc-enabled motor vehicles and the network infrastructure or a backend can be enabled, as a result of which the communication between purely ad-hoc-enabled group participants and purely cellular-network-enabled group participants can in turn be enabled or improved.

In one or more embodiments, a motor vehicle is provided, having a device corresponding to a device according to the invention for dispatching information between two mobile communication networks.

Through the teaching according to the invention, the advantage is achieved that hybrid network participant motor vehicles can be configured to be both mobile ad-hoc network-enabled and cellular-network-enabled in order to be able to function as a clusterhead and to enable them to be located together with non-hybrid network participants as a group in a hybrid network, i.e. a network which is set up as both a mobile ad-hoc network and a cellular network, in order to communicate with one another.

Before designs of the invention are described in more detail below, it should first be noted that the invention is not limited to the described components or the described method steps. Furthermore, the terminology used does not represent a restriction, but is merely used by way of example. Insofar as the singular is used in the description and the claims, the plural is in each case also included, unless the context explicitly excludes this.

Further examples of designs of the method according to the invention are explained below.

According to a first example of a design, if the decision to be a clusterhead is positive, the method furthermore entails: communicating the decision to be a clusterhead by dispatching a clusterhead decision group message via the second mobile communication network.

This design offers the advantage that the non-hybrid group participants in the corresponding hybrid network which are connected only with the second mobile communication network to the hybrid network can also be informed who is a clusterhead and that it is possible to communicate with the latter in order to exchange messages to and from the group.

According to a further example of a design, the method furthermore entails: initializing the clusterhead probability to the value one if no clusterhead probability is yet present or a clusterhead probability initialization instruction is present.

This design offers the advantage that the value for the clusterhead probability can be held dynamically, for example in the case where, if a participant leaves a group and moves to a new group, its clusterhead probability value can be reset in order to provide an improved foundation for the new process of deciding whether or not to be a clusterhead.

According to a further example of a design, the method is furthermore such that the decision interval is between 1 second and 60 seconds. However, the decision interval may also be shorter or longer, for example between 1 second and 30 seconds, depending on a situation of the corresponding group participant.

This design offers the advantage that the decision interval is dynamically adaptable in order to be able to take a better decision, according to the situation, as to whether a group participant becomes a clusterhead.

According to a further example of a design, the method is furthermore such that the decision interval is randomly definable.

This design offers the advantage that the decision interval and therefore the decision of a group participant to be a clusterhead can be made more dynamic.

According to a further example of a design, the method is furthermore such that the decision interval is definable depending on a speed of movement.

This design offers the advantage that an adaptation of the decision to be a clusterhead can be enabled depending on a situation of a frequent change of speed typical of a motor vehicle.

According to a further example of a design, the method is furthermore such that the clusterhead probability for each received beacon signal in the decision interval is reduced by a value which lies between zero and one. However, the value is preferably greater than zero. The value is particularly preferably greater than zero and less than or equal to 0.5, in particular less than or equal to 0.25.

This design offers the advantage that the decision of the corresponding group participant to be a clusterhead can be made even more dynamic, depending on the clusterheads in its environment.

According to a further example of a design, the method is furthermore such that the clusterhead probability for each received beacon signal in the decision interval is reduced by a value which is defined by means of a weighting, preferably by means of a weighting algorithm.

A weighting within the meaning of the invention may mean a process which performs the reduction of the clusterhead probability of the corresponding participant, depending on corresponding parameters which may be significant for the dynamic behavior of the group participants in the mobile hybrid network.

A weighting algorithm within the meaning of the invention may mean a process which dynamically performs the reduction of the clusterhead probability of the corresponding participant, depending on corresponding parameters which may be significant for the dynamic behavior of the group participants in the mobile hybrid network.

This design offers the advantage that the decision of the corresponding group participant to be a clusterhead can be made even more dynamic and can be adapted according to the situation.

According to a further example of a design, the method is furthermore such that the decision to be a clusterhead, with the clusterhead probability, can be taken depending on a threshold value for the clusterhead probability.

A threshold value within the meaning of the invention may mean a value with which, if the clusterhead probability falls below this value, it is always decided, for example, that the corresponding group participant does not become or is no longer a clusterhead.

This design offers the advantage that a simple decision facility is provided for potential clusterhead participants to decide when they function as a clusterhead and when they do not.

According to a further example of a design, the method is furthermore such that the decision to be a clusterhead is communicated by dispatching a clusterhead decision group message in a beacon signal.

This design offers the advantage that the decision to be a clusterhead can be communicated by means of an already existing notification structure.

According to a further example of a design, the method is furthermore such that the group message is dispatched and/or received as a broadcast message and/or as a unicast message.

This design offers the advantage that group messages can be dispatched and/or received by means of an already existing notification structure.

The invention thus allows it to be enabled that, in a mobile hybrid network, participants that are not hybrid-network-enabled and therefore support only one of the two networks can communicate with participants of the same hybrid network which support the other of the two networks in that participants that are hybrid-network-enabled can function as a gateway from one network into the other and independently ensure that they function as a gateway where this appears necessary, and, where this appears to be unnecessary, do not function as a gateway but instead as normal group participants in the mobile hybrid network.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
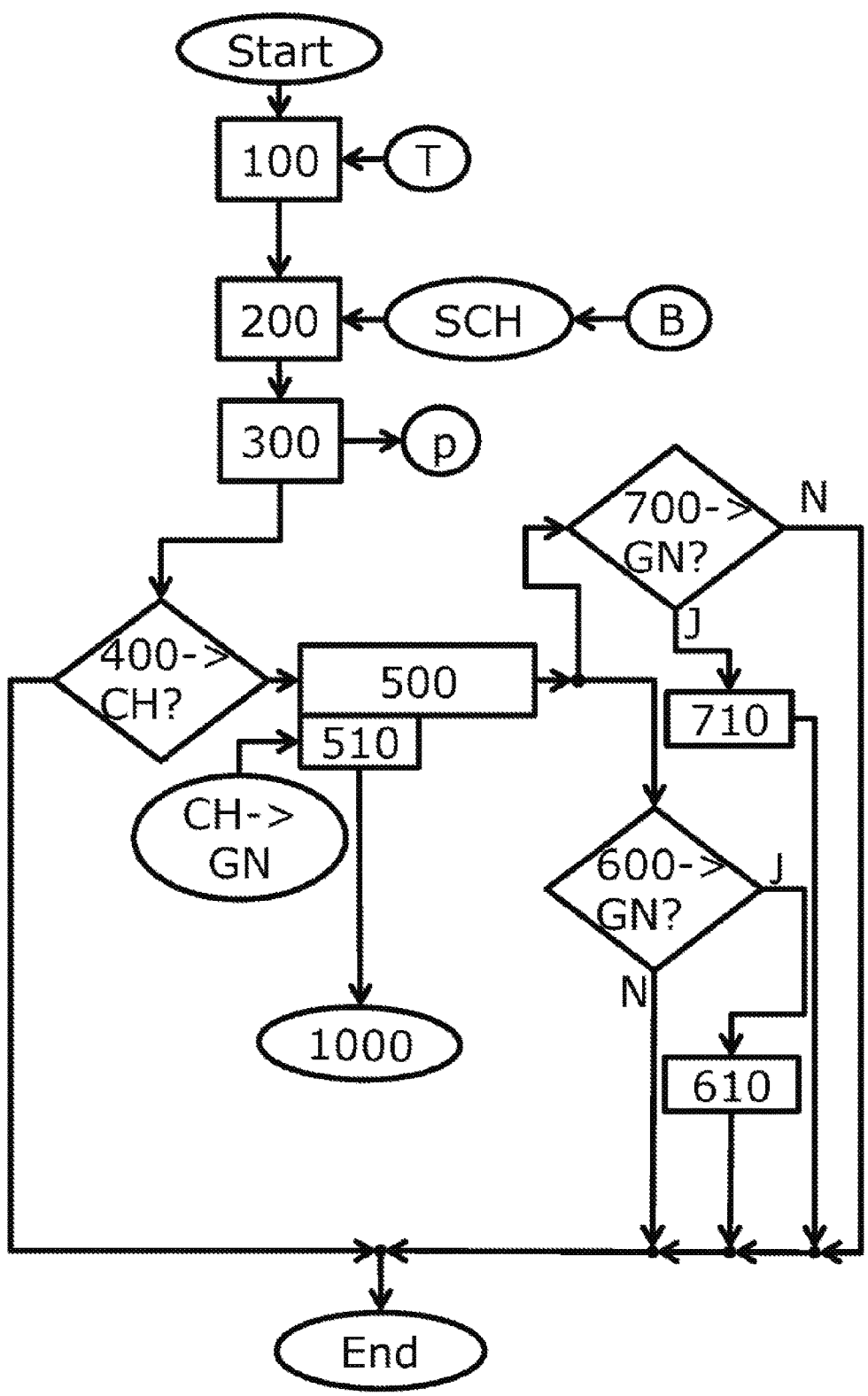
FIG. 1 shows a schematic flow diagram of a proposed method according to one example of a design of the invention.

FIG. 1 shows a schematic flow diagram of a proposed method according to one example of a design of the invention.

FIG. 1 shows a flow diagram of a method for dispatching information between two mobile communication networks 1000, 2000, wherein a first mobile communication network 1000 is preferably a mobile ad-hoc network MANET, in particular a vehicular ad-hoc network VANET, and wherein a second mobile communication network 2000 is preferably a cellular network CNET, the method entailing: defining 100 a decision interval T; monitoring 200 a signal channel SCH for receiving a beacon signal B; reducing 300 a clusterhead probability p for each received beacon signal B in the decision interval T; deciding 400 to be a clusterhead CH, with the clusterhead probability p. If the decision 400 to be a clusterhead CH is positive: communicating 500 the decision 400 to be a clusterhead CH by dispatching 510 a clusterhead decision group message CH-GN via the first mobile communication network 1000; if 600 a group message GN is received via the first mobile communication network 1000, dispatching 610 this group message GN via the second mobile communication network 2000, and if 700 a group message GN is received via the second mobile communication network 2000, dispatching 710 this group message GN via the first mobile communication network 1000.

Figure 2:
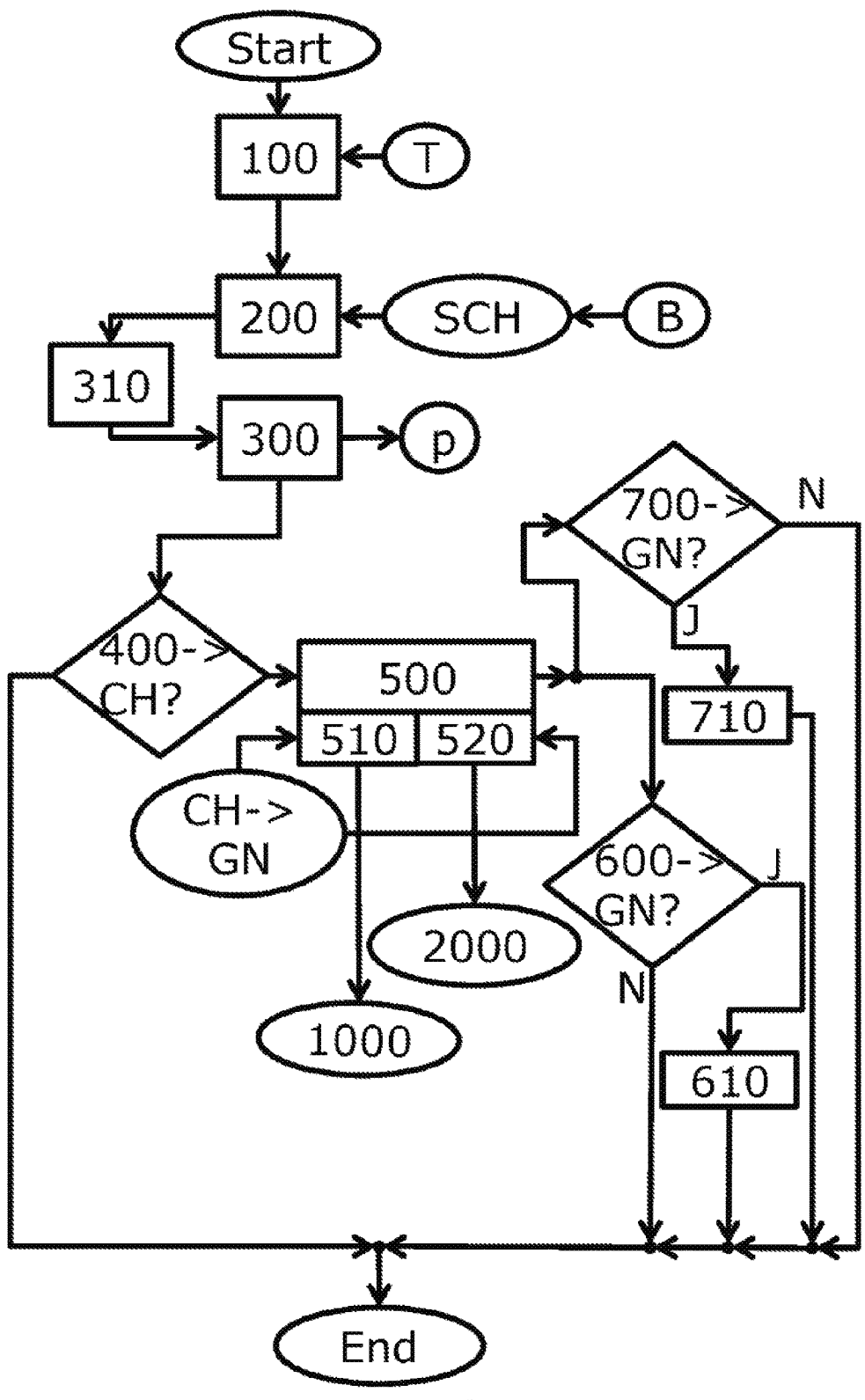
FIG. 2 shows a schematic flow diagram of a proposed method according to a further example of a design of the invention.

FIG. 2 shows a schematic flow diagram of a proposed method according to a further example of a design of the invention.

FIG. 2 shows a flow diagram of a method extended in comparison with the method from FIG. 1. The statements previously made in relation to FIG. 1 also apply accordingly to FIG. 2.

As can be seen in FIG. 2, if the decision 400 to be a clusterhead CH is positive, the method additionally entails: communicating 500 the decision 400 to be a clusterhead CH by dispatching 520 a clusterhead decision group message CH-GN via the second mobile communication network 2000. The method shown in FIG. 2 furthermore entails: initializing 310 the clusterhead probability value p to the value one, if no clusterhead probability value p is yet present or a clusterhead probability p initialization instruction is present.

Figure 3:
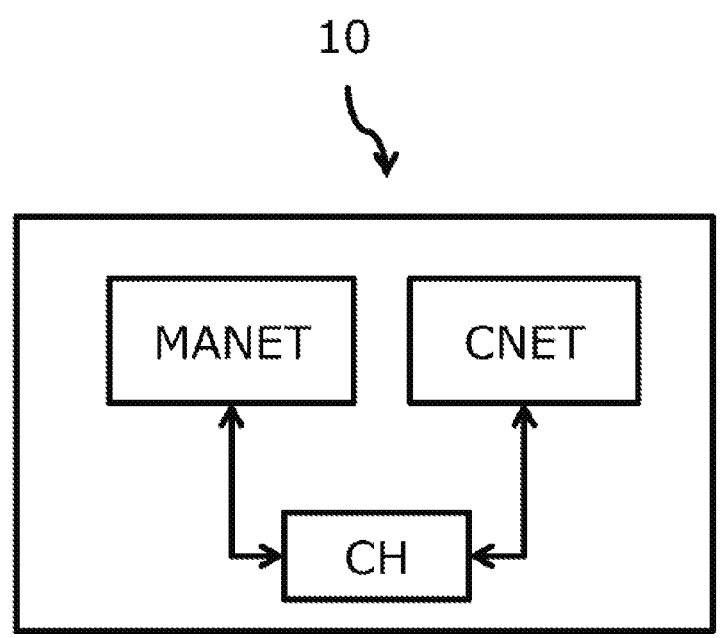
FIG. 3 shows a schematic representation of a proposed device according to one example of a design of the invention.

FIG. 3 shows a schematic representation of a proposed device according to one example of a design of the invention.

FIG. 3 shows a device 10 for dispatching information between two mobile communication networks 1000, 2000, wherein a first mobile communication network 1000 is preferably a mobile ad-hoc network MANET, in particular a vehicular ad-hoc network VANET, wherein a second mobile communication network 2000 is preferably a cellular network CNET, the device 10 having: a mobile ad-hoc network-enabled device MANET, in particular a vehicular ad-hoc network-enabled device VANET, a cellular-network-enabled device CNET and a clusterhead device CH. The clusterhead device CH is configured to carry out any method according to the invention.

Figure 4:
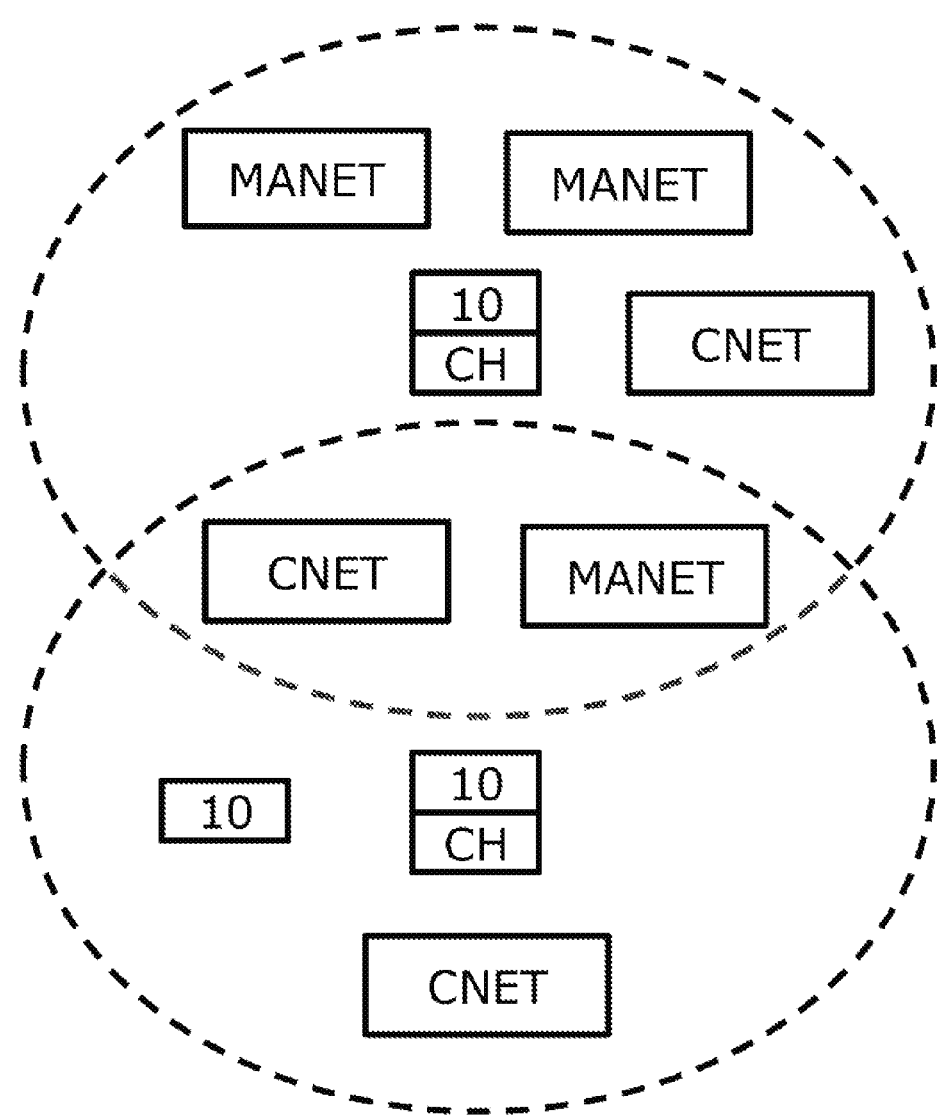
FIG. 4 shows a schematic representation of a clusterhead distribution within a group of a mobile hybrid network.

FIG. 4 shows a schematic representation of a clusterhead distribution within a group of a mobile hybrid network.

FIG. 4 shows a group of participating motor vehicles within a mobile hybrid network. Some motor vehicles MANET are purely ad-hoc-enabled and other motor vehicles CNET are purely cellular-network-enabled. Conversely, some further motor vehicles 10 are hybrid-network-enabled and therefore support both the MANET and the CNET. However, in the example shown in FIG. 4, it is not necessary for all hybrid-network-enabled motor vehicles 10 to function as a gateway CH in order to reach all group participants. Only two of these hybrid-network-enabled motor vehicles 10 function as a gateway CH or clusterhead CH and thus cover all participants of the group with their respective range (indicated by the two circles).

The idea of the invention can be summarized as follows. A method and two associated devices are provided, as a result of which it can become possible that, in a mobile hybrid network, participants that are not hybrid-network-enabled and therefore support only one of the two networks can communicate with participants of the same hybrid network that support the other of the two networks in that participants that are hybrid-network-enabled can function as a gateway from one network into the other and independently ensure that they are a gateway where this appears necessary and, where this does not appear necessary, they are not a gateway, but instead are normal group participants in the mobile hybrid network. As a result, it can be decided locally and dynamically which hybrid-network-enabled participant functions as a gateway and which does not, in order to guarantee an optimum coverage of the group participants in the mobile hybrid network and take account of the fact that not too many hybrid-network-enabled participants function as gateways and the mobile hybrid network is thus supplied with messages in an optimum manner without burdening it unnecessarily with redundant data/messages.

REFERENCE NUMBER LIST

100 Defining a decision interval
200 Monitoring a signal channel
300 Reducing a clusterhead probability
310 Initializing the clusterhead probability
400 Deciding to be a clusterhead
500 Communicating the decision to be a clusterhead
510 Dispatching a clusterhead decision group message via the first mobile communication network
520 Dispatching a clusterhead decision group message via the second mobile communication network
600 Is a group message received via the first mobile communication network?
610 Dispatching a group message via the second mobile communication network
700 Is a group message received via the second mobile communication network?
710 Dispatching a group message via the first mobile communication network
1000 First mobile communication network
2000 Second mobile communication network
B Beacon signal
CH Clusterhead
CH-GN Clusterhead decision group message
CNET Cellular network
GN Group message
MANET Mobile ad-hoc network
p Clusterhead probability
SCH Signal channel
T Decision interval
VANET Vehicular ad-hoc network The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dispatching information between a first mobile communication network and a second mobile communication network, wherein the first mobile communication network is a mobile ad-hoc network and the second mobile communication network is a cellular network, wherein the method comprises:
    defining a decision interval;
    monitoring a signal channel for received beacon signals;
    reducing a clusterhead probability for each received beacon signal in the decision interval;
    determining if a device is be a clusterhead, with the clusterhead probability,
    if the device is determined to be the clusterhead, the method further comprises:
        dispatching a clusterhead decision group message via the first mobile communication network indicating that the network participant was determined to be the clusterhead,
        dispatching a group message via the second mobile communication network if the group message is received via the first mobile communication network, and dispatching the group message via the first mobile communication network if the group message is received via the second mobile communication network.

2. The method as claimed in claim 1, wherein, if the network participant is determined to be the clusterhead, the method further comprises dispatching the clusterhead decision group message via the first mobile communication network indicating that the network participant was determined to be the clusterhead.

3. The method as claimed in claim 2, wherein the method further comprises initializing the clusterhead probability to a value of one, if
no clusterhead probability is yet present, or
a clusterhead probability initialization instruction is present.

4. The method as claimed in claim 1, wherein the method further comprises initializing the clusterhead probability to a value of one, if
no clusterhead probability is yet present, or
a clusterhead probability initialization instruction is present.

5. The method as claimed in claim 1, wherein
the decision interval is between 1 second and 60 seconds.

6. The method as claimed in claim 1, wherein
the decision interval is randomly definable.

7. The method as claimed in claim 1, wherein
the decision interval is definable depending on a speed of movement.

8. The method as claimed in claim 1, wherein
the cluster head probability for each received beacon signal in the decision interval is reduced by a value which is between 0 and 1.

9. The method as claimed in claim 1, wherein
the clusterhead probability for each received beacon signal in the decision interval is reduced by a value which is defined by means of a weighting algorithm.

10. The method as claimed in claim 1, wherein
the determination to be the clusterhead, with the clusterhead probability, is taken depending on a threshold value for the clusterhead probability.

11. The method as claimed in claim 1, wherein
the determination to be the clusterhead is communicated by dispatching the clusterhead decision group message in a beacon signal.

12. The method as claimed in claim 1, wherein
the group message is dispatched and as a broadcast message.

13. The method as claimed in claim 1, wherein
the group message is received as a unicast message.

14. The method as claimed in claim 1, wherein
the mobile ad-hoc network is a vehicular ad-hoc network.

15. A device configured to dispatch information between a first mobile communication network and a second mobile communication network, wherein the first mobile communication network is a mobile ad-hoc network and the second mobile communication network is a cellular network, wherein the device comprises:
a mobile ad-hoc network-enabled device;
a cellular-network-enabled device; and
a clusterhead-enabled device, wherein the clusterhead-enabled device is configured to:
define a decision interval;
monitor a signal channel for received beacon signals;
reduce a clusterhead probability for each received beacon signal in the decision interval;
determine if the clusterhead-enabled is be a clusterhead, with the clusterhead probability,
if the clusterhead-enabled is determined to be the clusterhead, the clusterhead-enabled device is further configured to:
dispatch a clusterhead decision group message, over the first mobile communication network via the mobile ad-hoc network-enabled device, indicating that the network participant was determined to be the clusterhead,
dispatch a group message, via the cellular-network-enabled device via the second mobile communication network, if the group message is received via the first mobile communication network, and
dispatch the group message, via the mobile ad-hoc network-enabled device over the first mobile communication network, if the group message is received via the second mobile communication network.

16. The device as claimed in claim 15, wherein
the mobile ad-hoc network is a vehicular ad-hoc network.

17. A motor vehicle having a device configured to dispatch information between a first mobile communication network and a second mobile communication network, wherein the first mobile communication network is a mobile ad-hoc network and the second mobile communication network is a cellular network, wherein the device comprises:
a mobile ad-hoc network-enabled device;
a cellular-network-enabled device; and
a clusterhead-enabled device, wherein the clusterhead-enabled device is configured to:
define a decision interval;
monitor a signal channel for received beacon signals;
reduce a clusterhead probability for each received beacon signal in the decision interval;
determine if the clusterhead-enabled is be a clusterhead, with the clusterhead probability,
if the clusterhead-enabled is determined to be the clusterhead, the clusterhead-enabled device is further configured to:
dispatch a clusterhead decision group message, over the first mobile communication network via the mobile ad-hoc network-enabled device, indicating that the network participant was determined to be the clusterhead,
dispatch a group message, via the cellular-network-enabled device via the second mobile communication network, if the group message is received via the first mobile communication network, and
dispatch the group message, via the mobile ad-hoc network-enabled device over the first mobile communication network, if the group message is received via the second mobile communication network.

* * * * *